(12) United States Patent
Nelson et al.

(10) Patent No.: US 9,669,799 B2
(45) Date of Patent: Jun. 6, 2017

(54) SEATBELT PRETENSIONER (71) Applicant: Autoliv ASP, Inc., Ogden, UT (US)

(72) Inventors: Earl Henry Nelson, West Haven, UT (US); Hans-Otto Kock, Kiebitzreihe (DE); Isaac Hoffman, Kaysville, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 435 days.

(21) Appl. No.: 13/833,992

(22) Filed: Mar. 15, 2013

(65) Prior Publication Data
US 2014/0263809 A1 Sep. 18, 2014

(51) Int. Cl.
*B60R 22/44* (2006.01)
*B60R 22/46* (2006.01)

(52) U.S. Cl.
CPC .... B60R 22/4633 (2013.01); *B60R 2022/468* (2013.01); *B60R 2022/4638* (2013.01)

(58) Field of Classification Search
CPC ............ B60R 22/1954; B60R 22/4633; B60R 2022/468; B60R 2022/4638
See application file for complete search history.

(56) References Cited

U.S. PATENT DOCUMENTS

| | | | | | |
|---|---|---|---|---|---|
| 3,219,288 | A | * | 11/1965 | Stewart | 242/370 |
| 3,881,667 | A | * | 5/1975 | Tandetzke | 242/384.3 |
| 3,970,266 | A | * | 7/1976 | Doin et al. | 242/374 |
| 4,006,644 | A | * | 2/1977 | Beier | 297/478 |
| 4,421,342 | A | * | 12/1983 | Brown, Jr. | 280/740 |
| 5,823,570 | A | * | 10/1998 | Lane et al. | 280/806 |
| 7,424,984 | B2 | * | 9/2008 | Jabusch | 242/374 |
| 7,424,985 | B2 | * | 9/2008 | Stevens et al. | 242/374 |
| 7,424,986 | B2 | * | 9/2008 | Stevens | 242/374 |
| 7,744,029 | B2 | * | 6/2010 | Gentner | 242/379.1 |
| 2008/0006732 | A1 | * | 1/2008 | Clute et al. | 242/390.5 |

FOREIGN PATENT DOCUMENTS

| | | |
|---|---|---|
| DE | 102007006012 | 2/2007 |
| DE | 102012214505.2 | 8/2012 |
| EP | 1525123 B1 | 7/2003 |
| EP | 1731386 B1 | 5/2006 |

* cited by examiner

*Primary Examiner* — Sang Kim
(74) *Attorney, Agent, or Firm* — Brinks Gilson & Lione

(57) ABSTRACT

A seatbelt pretensioner is provided including an inner tube with a gas generator housed therein, an intermediate sleeve extending over the inner tube, and a spool portion housing the sleeve and the tube. The spool portion includes spiraling flutes thereon that correspond to a protruding member in the form of flutes or pegs extending from the intermediate sleeve. In response to the gas generator firing, the sleeve will be driven longitudinally, causing the protruding member to act on the spiraling flutes of the spool, thereby causing the spool to rotate. The intermediate sleeve can include a spiraling slot that receives a peg from the inner tube, so that the intermediate sleeve will rotate to compound the spool rotation.

18 Claims, 12 Drawing Sheets

SEATBELT PRETENSIONER

FIELD OF THE INVENTION

The present embodiments relate generally to a pretensioner system for a motor vehicle seatbelt system. More specifically, the present embodiments relate to a pyrotechnic lap pretensioner.

BACKGROUND

The use of seatbelt pretensioners for pretensioning a seatbelt in the event of a collision is common in the art. Pretensioners are used, generally, to pretension a seatbelt during a collision, which will remove the slack and cause the seatbelt to become tighter on the occupant wearing the seatbelt. Tightening the seatbelt in the event of a collision can limit the amount that the occupant will travel forward during a crash (excursion) and can reduce peak loads acting on the occupant during a crash sequence. Pretensioners are generally activated by sensors in the vehicle that determine that a collision has occurred (or is imminent).

One type of pretensioners is known as a linear pretensioner, and typically involves the use of a piston that travels linearly propelled by gas produced by a pyrotechnic gas generator. A cable or other element is coupled to the piston and a component of the seat belt system thereby linearly pulling on the belt in a single direction. The piston can be attached to an end of the seatbelt or a seatbelt anchorage and can be coupled to the lap belt or shoulder belt section of a three-point belt system, or both. Presently available linear pretensioner devices are limited in the amount that the seatbelt can be pulled by the stroke of the piston. Space constraints within the vehicle can limit the size and length of the piston, thereby limiting the length that the belt can be pulled. Along with cost concerns, packaging constraints are always present in a motor vehicle component design and implementation. Accordingly, compact and cost-effective designs are highly desirable for automotive manufacturers and their suppliers.

Another type of seat belt pretensioner is in the form or a rotary pretensioner. One type is a so-called pyrotechnic rotopretensioner. A pyrotechnic rotopretensioner generally includes a rotatable spool with a sprocket or pinion having radially extending teeth. A series of masses such as ball masses are arranged in a string and are guided through a tube connected to a gas generator. In the event of a collision, the gas generator is activated to propel the ball masses along a guide path toward the spool sprocket. The ball masses interact with the spool sprocket in a generally tangential manner, making contact with the teeth and causing the spool to rotate about a spindle. The spindle is connected to the seatbelt webbing, causing the seatbelt to become wound, thereby shortening the length of the belt and pretensioning the belt. Although pyrotechnic rotopretensioners perform well, there is a continuing desire to reduce packaging space requirements.

SUMMARY

A seatbelt pretensioning system for acting on a seatbelt of an occupant restraint system of a motor vehicle is provided having a rotatable spool or spindle that is coupled to a longitudinally translatable sleeve therein. The spool and sleeve can be coupled with a spiraling portion on one and a follower portion on the other, such that longitudinal translation of the sleeve will cause rotational movement of the spool. The sleeve and spool can be aligned coaxially. In another form, the sleeve can rotate as well as translate to rotate the spool.

In another form, a longitudinally translatable piston can be spirally coupled to a rotatable drive member extending therethrough, so that translation of the piston will cause rotation of the drive member. The drive member can be coupled to a spool or spindle via gearing.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION

Figure 1:
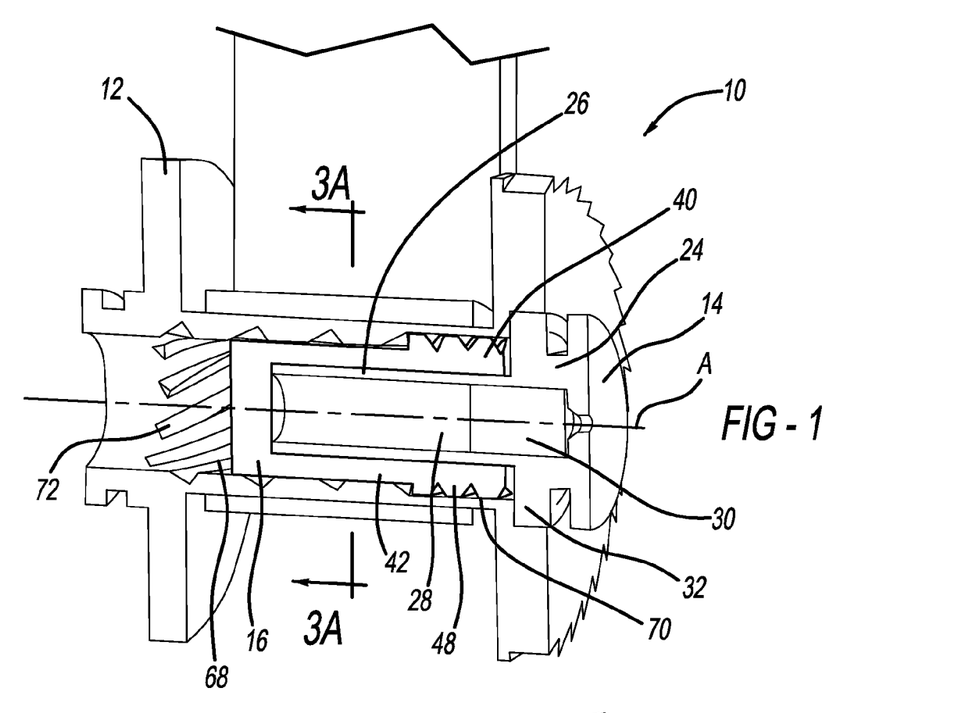
FIG. 1 is a cross-sectional view of a first embodiment of a seatbelt pretensioner showing the pretensioner in a first non-deployed condition.
Figure 2:
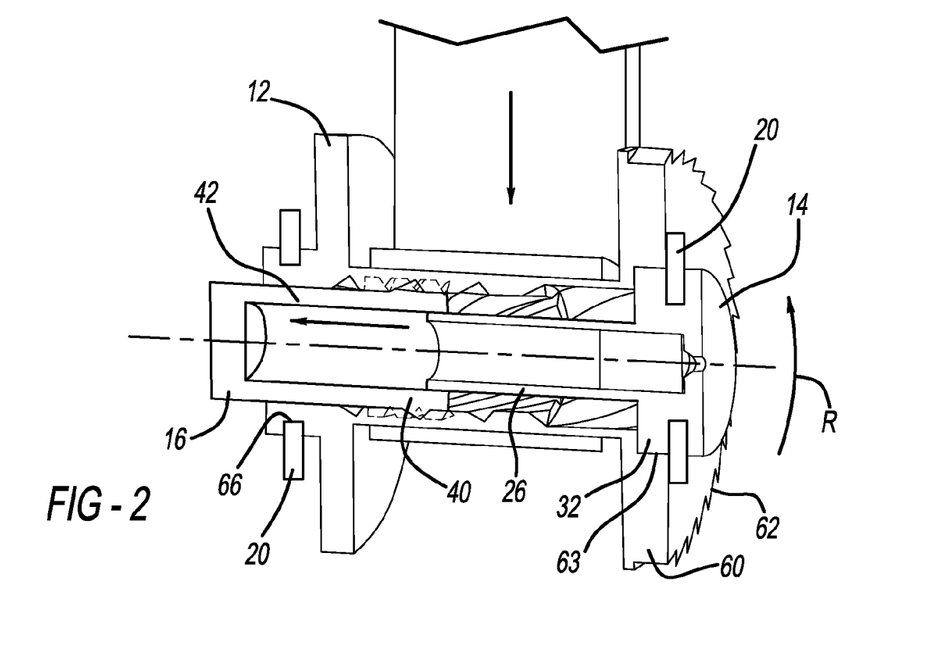
FIG. 2 is a cross-sectional view of the pretensioner in a second deployed condition.
Figures 3, 3A:
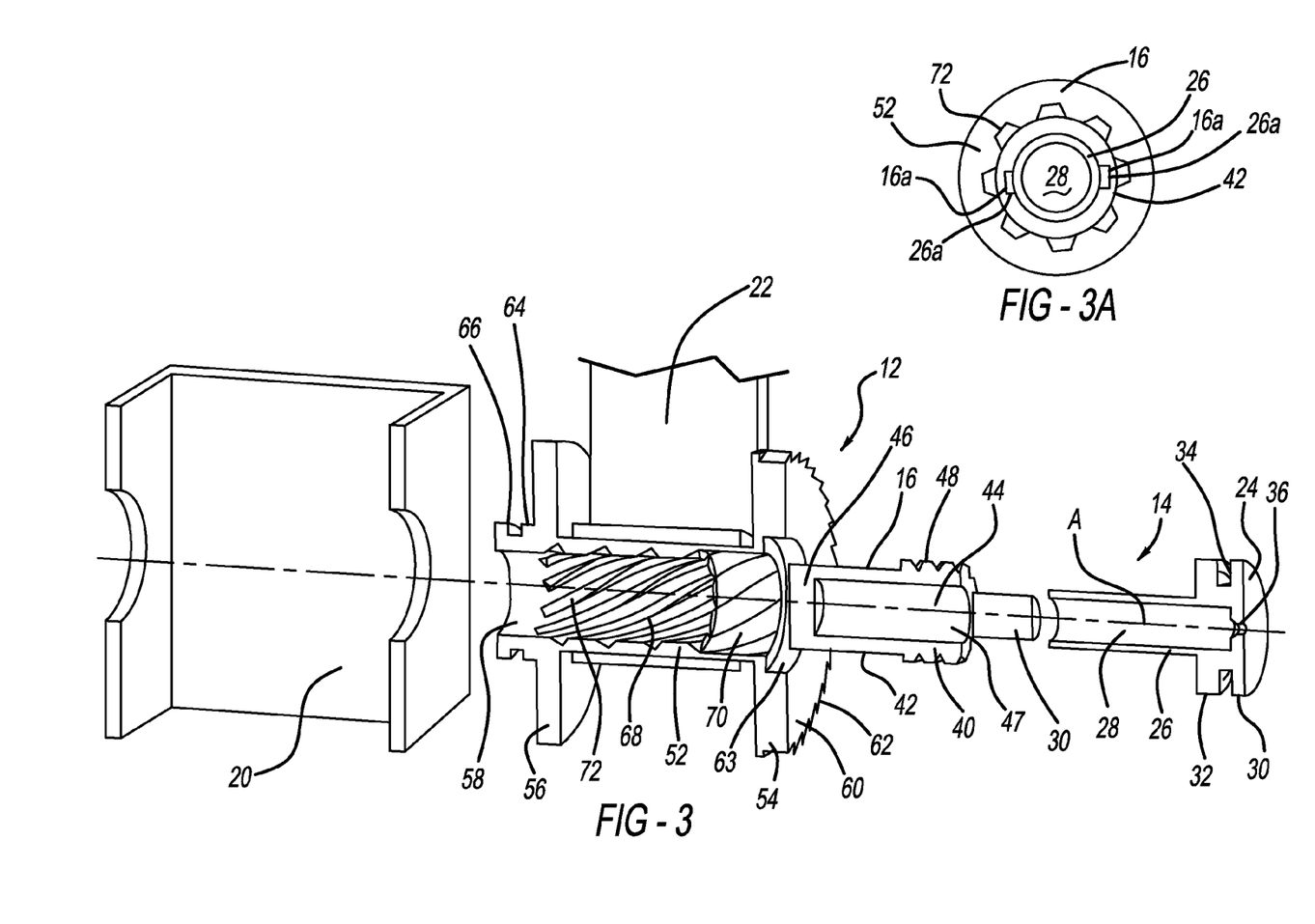
FIG. 3 is an exploded view of the pretensioner.
FIG. 3A is a cross-sectional view of the pretensioner taken along line 3A-3A in FIG. 1.
Figure 4:
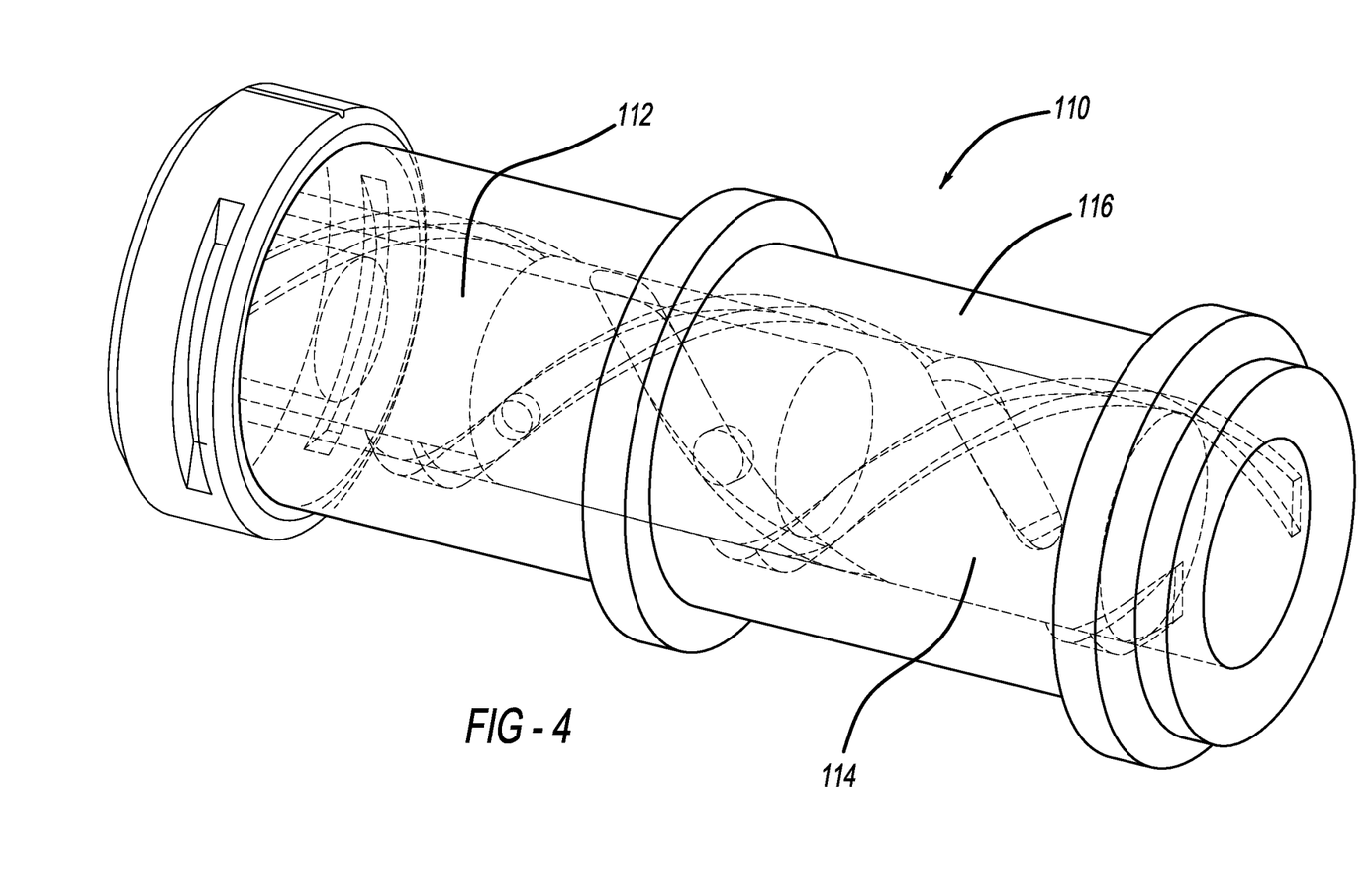
FIG. 4 is an isometric view of a second embodiment of a seatbelt pretensioner.

Referring now to the drawings, FIGS. 1-3 illustrate a seatbelt pretensioning device 10 in accordance with a first embodiment of this invention having a spool member 12, a tube member 14, and an intermediate sleeve or drive member 16. The tube member 14 includes a gas generator 18 mounted therein that, when fired, causes the drive member 16 to be driven longitudinally therefrom. The drive member 16 is spirally coupled to the spool member 12 to convert linear translation of the drive member 16 to rotational movement of the spool 12. The device 10 can be coupled to a bracket or housing 20 that allows the spool 12 to rotate relative thereto. Seatbelt webbing 22 is coupled to the spool 12 that will wind around the spool 12 in response to rotation thereof.

The tube member 14 includes a head portion 24 and a tubular shaft portion 26 that, in combination, define a cavity 28 that defines a longitudinal axis A. A gas generator 30 is mounted within the cavity 28 within the head portion 24 for driving the drive member 16 away from the head portion 24. The head portion 24 includes an outer flange 30 and an inner flange 32. An annular recess 34 is defined between the flanges 30 and 32. The inner flange 32 preferably has a circular profile to allow for rotation of the spool 12, which is rotationally coupled to the inner flange 32.

The outer flange 30 includes an opening 36 therethrough that provides communication between the cavity 28 and the exterior. The opening 36 can allow a wire or the like to connect the gas generator 30 within the cavity 28 to a controller (not shown) that activates the gas generator 30.

With reference to FIG. 3A, the shaft portion 26 has a generally tubular shape that allows for linear translation of the drive member 16 relative thereto. The shaft portion 26 can include a protruding rail 26a or the like that cooperates with a corresponding slot 16a in the drive member 16 to allow for translation of the drive member 16 longitudinally, but restrict the drive member 16 from rotating relative to the shaft portion 26.

When assembled, the tube member 14 is coupled to the housing 20 and restricted from rotating. In one form, the housing 20 is coupled to the head portion 24 via the annular cavity 34 to restrict the tube member 14 from moving longitudinally due the flanges 30 and 32 on either side.

The drive member 16 is configured to fit around the outside of the tube member 14 and, accordingly, the drive member 16 could also be referred to as a sleeve. More specifically, the drive member 16 includes a head portion 40 and a body portion 42 that combine to define a longitudinal cavity 44. The diameter of the cavity 44 is sized to be greater than or equal to the outer diameter of the shaft portion 26 of the tube member 14, such the tube member 14 can be received within the cavity 44 of the drive member 16. The drive member 16 includes an endwall 46 at one end of the cavity 44 and an opening 47 at the opposite end. Pressurized gas from the gas generator 30, when fired, will act against the endwall 46 to force the drive member 16 away from the tube member 14.

The head portion 40 of the drive member 16 includes multiple flutes 48 that extend radially outward in a spiraling pattern. The spiraling pattern of the flutes 48 will operate to convert linear translation of the drive member 16 into rotational movement of the spool 12, as further described below.

The body portion 42 of the drive member 16 can include the slot 16a that corresponds to the rail 26a to limit rotation of the drive member 16 as it is driven away from the gas generator 30, so that the flutes 48 force the spool 16 to rotate.

The spool 12 includes a body portion 52, a head portion 54 at one end, and a foot portion 56 at the opposite end, which combine to define a longitudinal cavity 58 therethrough. The head portion 54 includes a flange portion 60 having a generally circular shape, and includes a plurality of ratchet teeth 62 extending outwardly therefrom. The head portion 54 further includes a generally cylindrical recess 63 that corresponds to the inner flange 32 of the head portion 24 of the tube member 14.

The foot portion 56 includes a circular flange 64 extending radially outward that is positioned longitudinally inward of an annular recess 66. The annular recess 66 is rotationally coupled to the housing 20 to allow the spool 12 to rotate relative thereto. The head portion 54 of the spool 12 rotates relative to the tube portion 14 via the coupling between the cylindrical recess 63 and the inner flange 32.

The cavity 58 includes a fluted portion 68 and a housing portion 70. The fluted portion 68 defines multiple spiral flutes 72 that correspond to the spiraling pattern of the flutes 48 of the head portion 40 of the drive member 16. The fluted portion 68 also includes an inner diameter that generally corresponds to the outer diameter of the body portion 42 of the drive member 16. The housing portion 70 has an inner diameter that is greater than the inner diameter of the fluted portion 68, and is also greater than the outer diameter of the head portion 40 of the drive member 16, such that the head portion 40 of the drive member 16 can be housed therein prior to the drive member 16 being translated in response to activation of the gas generator 30.

The flutes 72 each terminate prior to the end of the cavity 58, such that the drive member 16 will be retained by the flutes 48 contacting the terminal ends of the flutes 72 as they spiral relative to each other.

The above description of the spool 12 and the drive member 16 has related to both the drive member 16 and the spool 12 having spiraling flutes 48 and 72, respectively, that are coupled together to rotate the spool 12 in response to translation of the drive member 16. In this regard, one of the flutes 48 or 72 can be described as a follower member that tracks along the other. Accordingly, it will be appreciated that other shapes of a follower member could be used that will track along a spiraling flute, such as a peg, post, ball bearing, or the like. Moreover, either the spool 12 or the drive member 16 could include the follower member, with the other including the spiraling flute 48 or 72.

The pretensioner device 10 has a first non-fired state and a second fired state, as well as transitional states occurring in between. In the first state, shown in FIG. 1, the drive member 16 is housed within the spool 12, with the body portion 42 housed within the fluted portion 68, and the head portion 40 housed within the housing portion 70. The flutes 48 can be partially engaged with the flutes 72. The shaft portion 26 of the tube member 12 is housed within the cavity 44 of the drive member 16, with the head portion 24 of the tube member 14 adjacent the head portion 40 of the drive member. The gas generator 30 is mounted within the head portion 24 of the tube member 14. The inner flange 32 of the tube member 14 is received within the cylindrical recess 63 of the spool 12, allowing rotation of the spool member 12 relative to the tube member 14.

In response to a vehicle event where pretensioning is desired, the device 10 will transition from the first state to the second state, which is shown in FIG. 2. More particularly, the gas generator 30 will fire, causing an increase in pressure within the cavity 28 of the tube member 14. In response to the increased pressure, the drive member 16 will be forced away from the gas generator 30 longitudinally. The drive member 16 will be restricted form rotating due to the engagement between the rail 26a and the slot 16a.

As the drive member 16 is translated, the flutes 48 of the head portion 40 will track along the flutes 72 of the cavity 58 in the spool 12. The spiral shape of the flutes 72 and the flutes 48 will cause the spool 12 to rotate in response. The spool 12 will rotate about the tube portion 14 via the cylindrical cavity 63 and about the housing 20 via the annular recess 66.

The drive member 16 will stop translating longitudinally when the flutes 48 contact the terminal ends of the flutes 72, and the spool 12 will stop rotating. The rotation of the spool 12 will cause the seatbelt webbing 22 to be wrapped around the spool 12, thereby pretensioning the seatbelt.

As the spool rotates, the ratchet teeth 72 will allow the spool 12 to rotate in a first direction R, but restrict the spool from rotating in the opposite direction in a manner known in the art.

Turning now to FIGS. 4-8, a pretensioning device 110 in a second embodiment is provided. The device 110 includes an inner tube 112, an intermediate sleeve 114, and a spool 116. The spool 116 houses the intermediate sleeve 114 and a portion of the inner tube 112. The sleeve 114 will translate and rotate to cause rotation of the spool 116, as further described below.

Figure 5:
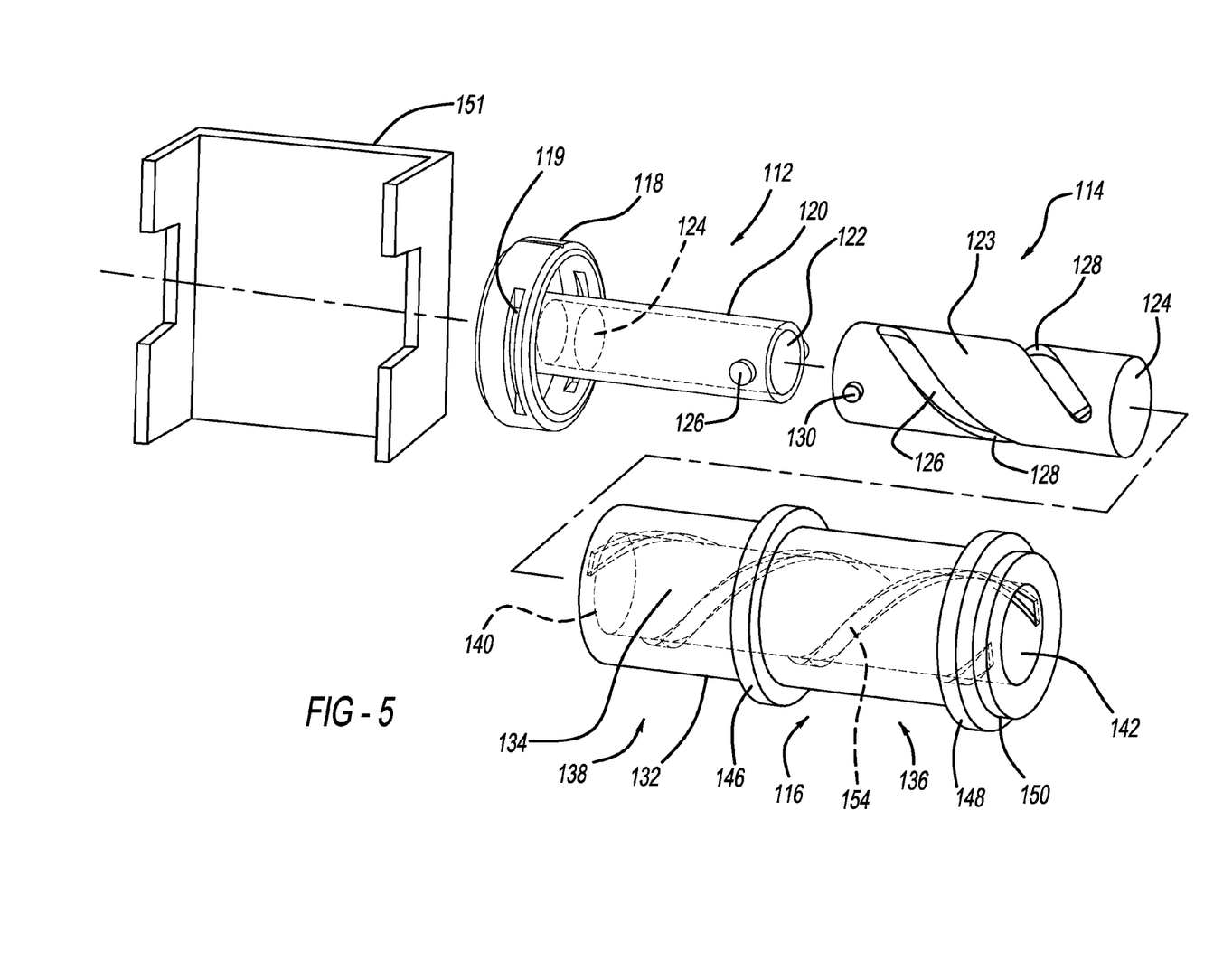
FIG. 5 is an exploded view of the second embodiment of the seatbelt pretensioner.

With reference to FIG. 5, the inner tube 112 includes a head portion 118 and shaft portion 120 that defines a cavity 122 therein. A gas generator 124 is mounted within the cavity 122 adjacent the head portion 118. The inner tube 112 includes a pair of round pegs 126 extending radially outward from the outer surface of the shaft portion 120 at the end opposite the head portion 118. The pegs 126 extend from, preferably, diametrically opposite points on the shaft portion 120. However, the pegs 126 could be circumferentially closer, if desired. Moreover, a single peg 126 could be used, or more than two pegs 120 could be used. For the purposes of discussion, a pair of pegs 126 will be described. The head portion 118 further includes a pair of straight slots 119 that can prevent rotation of the inner tube 112.

The intermediate sleeve 114 has a generally tubular sidewall 123 and an endwall 124 that define a cavity 126 therein. The diameter of the cavity 126 is sized larger than the outer diameter of the inner tube 112 so that the sleeve 114 can slide over and translate relative to the inner tube 112. The sleeve 114 further includes a pair of spiraling slots 128. The slots 128 spiral around the sidewall 123 at diametrically opposed locations along the length of the sidewall 123 to correspond to the spacing of the pegs 126 of the inner tube 112. The slots 128 have a width that is sized to correspond to the width of the pegs 126, so that the pegs 126 can fit within the slots 128. In the case where there is only one peg 126 or more than two pegs 126, then the number of slots 128 will decrease or increase accordingly. Similarly, if the circumferential spacing of the pegs 126 changes, then the spacing of the slots 128 will change accordingly.

The sleeve 114 further includes a pair of pegs 130 that extend radially outward from the sidewall 122 at the end of the sleeve 114 opposite the endwall 124. In one form, the pegs 130 are on diametrically opposite sides of the sidewall 123, but other circumferential spacing could also be used, as well as using one peg 130 or more than two pegs 130. The pegs 130 have a generally circular shape, similar to the pegs 120 of the inner tube 112.

The spool 116 is configured to house the inner tube 112 and intermediate sleeve 114 therein. The spool 116 includes a tubular sidewall 132 that defines a cavity 134 therein. The sidewall 132 includes a spool portion 136 and a non-spool portion 138. The spool 116 includes a first open end 140 at the non-spool portion 138 and a second open end 142 at the spool portion 136. The spool portion 136 is configured to wrap seatbelt webbing 144 (FIG. 6) therearound when the spool 116 rotates.

The spool portion 136 includes a first radial flange 146 and a second radial flange 148, as well as a first annular recess 150 adjacent the second radial flange. The spool 116 can rotate via the first annular recess 150 via a bearing connection with a housing 151, further described below.

The spool 116 further includes a pair of spiraling flutes 154 within the cavity 134 defined by the sidewall 132. The spiraling flutes 154 spiral in an opposite direction than the slots 128 of the sleeve 114. The spiraling flutes 154 are disposed on opposite sides of the cavity 134 along the length of the cavity 134, and have a width corresponding to the width of the pegs 130 that extend from the intermediate sleeve 114. Thus, if the number or spacing of the pegs 130 changes, the spiraling flutes 154 can be arranged to correspond to the number and spacing of the pegs 130.

The opposite spiraling pattern of the flutes 154 relative to the slots 128 can thereby compound the rotation of the intermediate sleeve 114 and the spool 116 in the same direction, further described below. As the intermediate sleeve 114 is caused to move longitudinally away from the gas generator 124 and rotate in a first direction caused by the interaction between the pegs 126 and the spiraling slots 128, the pegs 130 will act on the flutes 154 to rotate the spool 116 in the same first rotational direction.

Figure 6:
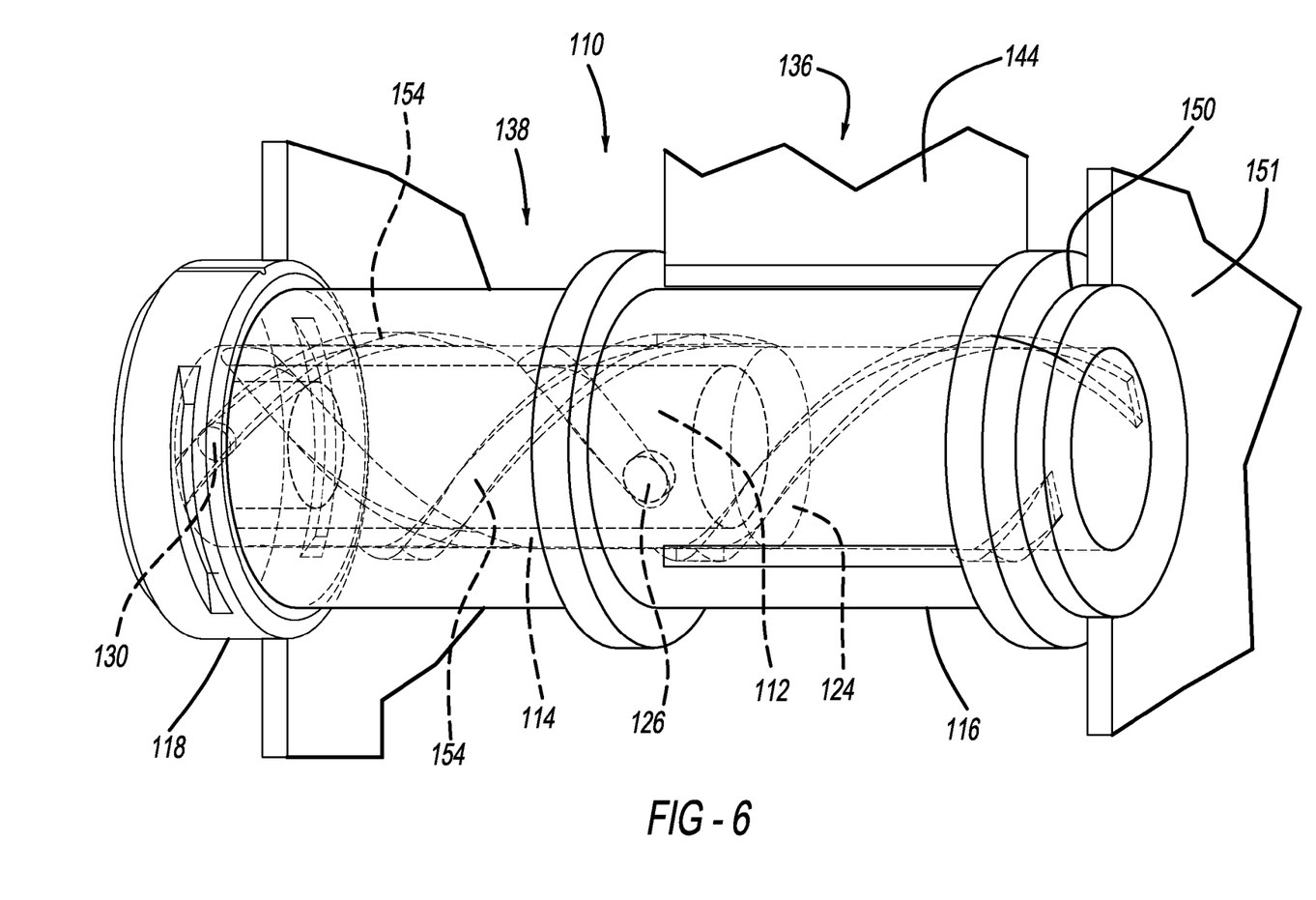
FIG. 6 is an isometric view of the second embodiment of the seatbelt pretensioner in a first non-deployed condition.
Figure 7:
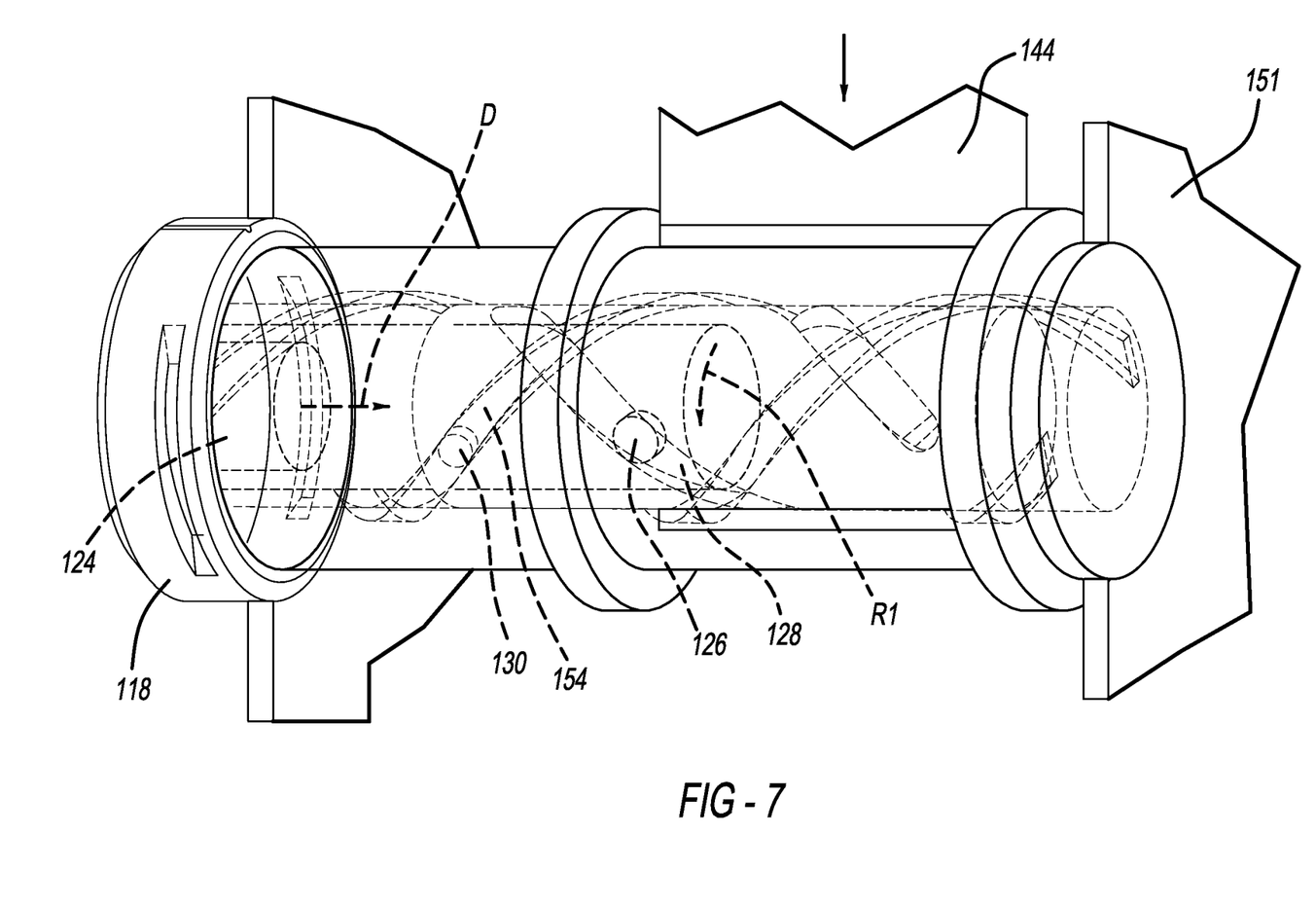
FIG. 7 is an isometric view of the second embodiment of the seatbelt pretensioner in a second partially deployed condition.
Figure 8:
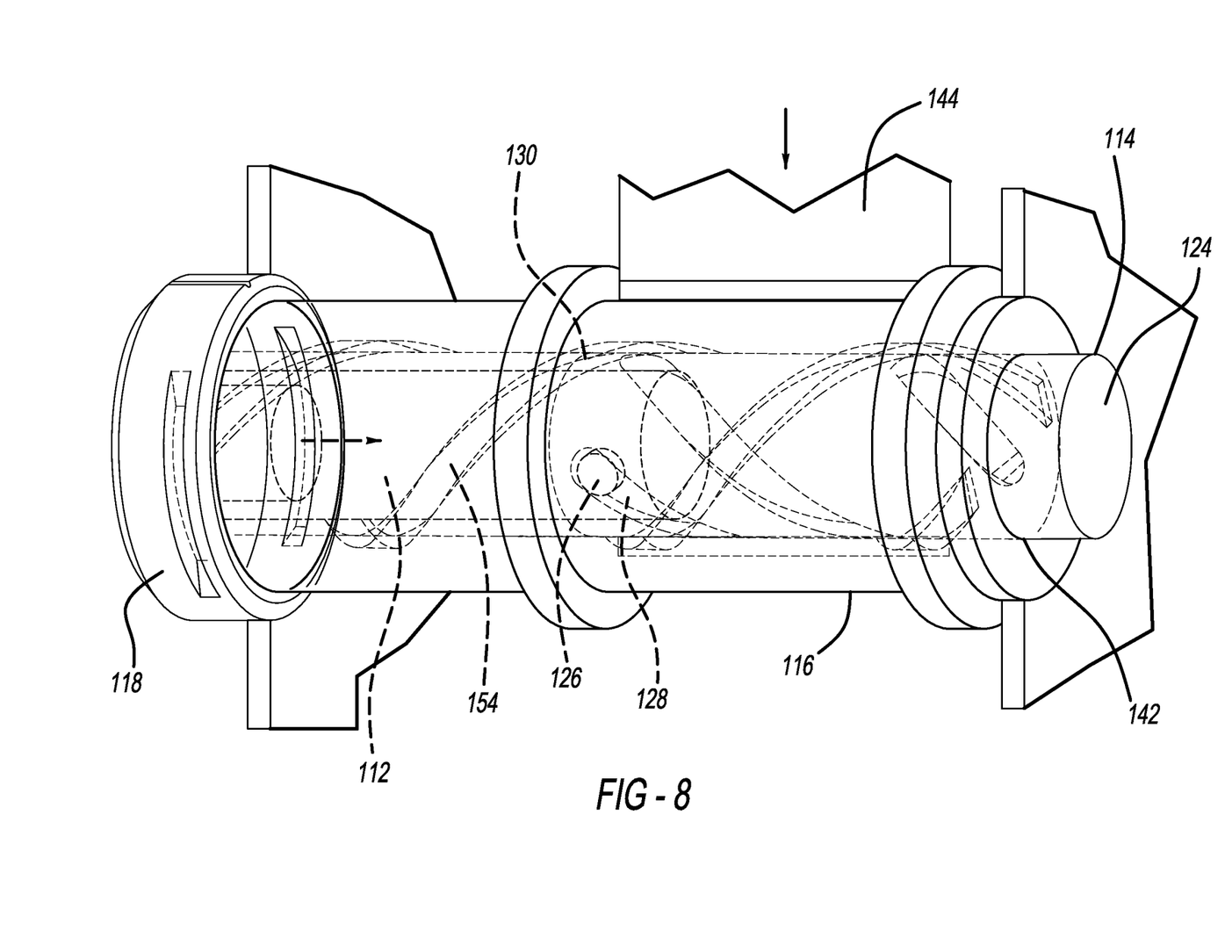
FIG. 8 is an isometric view of the second embodiment of the seatbelt pretensioner in a third deployed condition.

With reference to FIGS. 6-8, the device 110 includes a first non-fired state and a second fired state, as well as intermediate states in between. In the first state, shown in FIG. 6, the intermediate sleeve 114 is disposed over the inner tube 112, such that the inner tube 112 is received within the cavity 126 of the intermediate sleeve. The intermediate sleeve 114 is disposed adjacent the head portion 118 of the inner tube 112. The pegs 126 of the inner tube 112 extend into the spiraling slots 128 of the intermediate sleeve 114. The endwall 124 of the intermediate sleeve is disposed adjacent the end of the inner tube 112 that is opposite the head portion 118 of the inner tube 112. The spool 116 is disposed over the intermediate sleeve 114 and the inner tube 112. The spool portion 136 is disposed away from the head portion 118 of the inner tube 112. The pegs 130 of the intermediate sleeve 114 extend into the spiral flutes 154 of the spool 116. The spool 116 can extend partially into the head portion 118 of the inner tube 112.

With reference to FIGS. 7 and 8, in response to a vehicle event causing a desire for pretensioning, such as a collision, the gas generator 124 within the inner tube 112 will be caused to fire, causing the device 110 to transition from the first non-fired state to the second fired state. In response to the gas generator 124 being fired, the pressure within the inner tube 112 will increase. This pressure will act on the intermediate sleeve 114 causing the intermediate sleeve 114 to be forced away from the gas generator 124 in the direction D. As the intermediate sleeve 114 is forced away longitudinally, the pegs 126 of the inner tube will act on the intermediate sleeve 114 to cause the sleeve 114 to rotate in the direction R1. More specifically, the longitudinal force exerted on the intermediate sleeve 114 will be converted into rotational movement by the interaction between the pegs 126 and the slots 128. The spiral shape of the slots 128 will cause the intermediate sleeve 114 to rotate in the direction R1. Thus, the sleeve 114 will rotate in the direction R1 as it translates longitudinally in the direction D.

As the sleeve 114 translates and rotates, the pegs 130 of the sleeve will act against the spiral flutes 154 of the spool 116. The spiraling direction of the spiral flutes 154 is opposite the translating and rotating direction of the pegs 130 as they move with the sleeve 114, such that the pegs 130 will cause the spool 116 to rotate in the same rotational direction R1 as the pegs 130 track along and act against the spiral flutes 154. The spool 116 can be restricted from translating by its bearing attachment to the housing 151, which allows for rotation while limiting longitudinal translation.

With reference to FIG. 8, the intermediate sleeve 114 will continue to translate and rotate through the cavity 134 of the spool 116, such that the endwall 124 of the sleeve 114 will extend through the opening 142 of the spool 116. The intermediate sleeve 114 will stop translating and rotating once the intermediate sleeve 114 has translated and rotated such that the pegs 126 of the inner tube 112 contact the ends of the spiraling slots 128 of the intermediate sleeve 114. At the completion of the rotation and translation of the intermediate sleeve 114, the spool 116 will accordingly complete its rotation. During the rotation of the spool 116, the seatbelt webbing 144 attached thereto will become wound around the spool 116, pretensioning the seatbelt.

The above embodiments of the device 10, 110 each convert linear translation of an intermediate member (the intermediate sleeve 114 or the drive member 16) into rotational movement of a spool attached to seatbelt webbing. It will be appreciated that structural aspects of one of the device 10 or 110 can be used with the other device 10 or 110 without undue experimentation. For example, the ratcheting teeth 62 of the device 10 could be used in a similar manner on the device 110. Similarly, the slots 119 in the head portion 118 of the inner tube 112 that limit rotation of the inner tube 112 could be used on the inner tube 14 of the device 10.

In one form, the intermediate sleeve 114 could be made to translate without rotation, if the compound rotation described above is not desired by using a straight rail-type connection to the tube 112. Similarly, the drive member 16 could be made to rotate as well as translate by using a spiraled slot connection to the tube 12 to compound the rotation of the spool 12, if desired.

Figure 9:
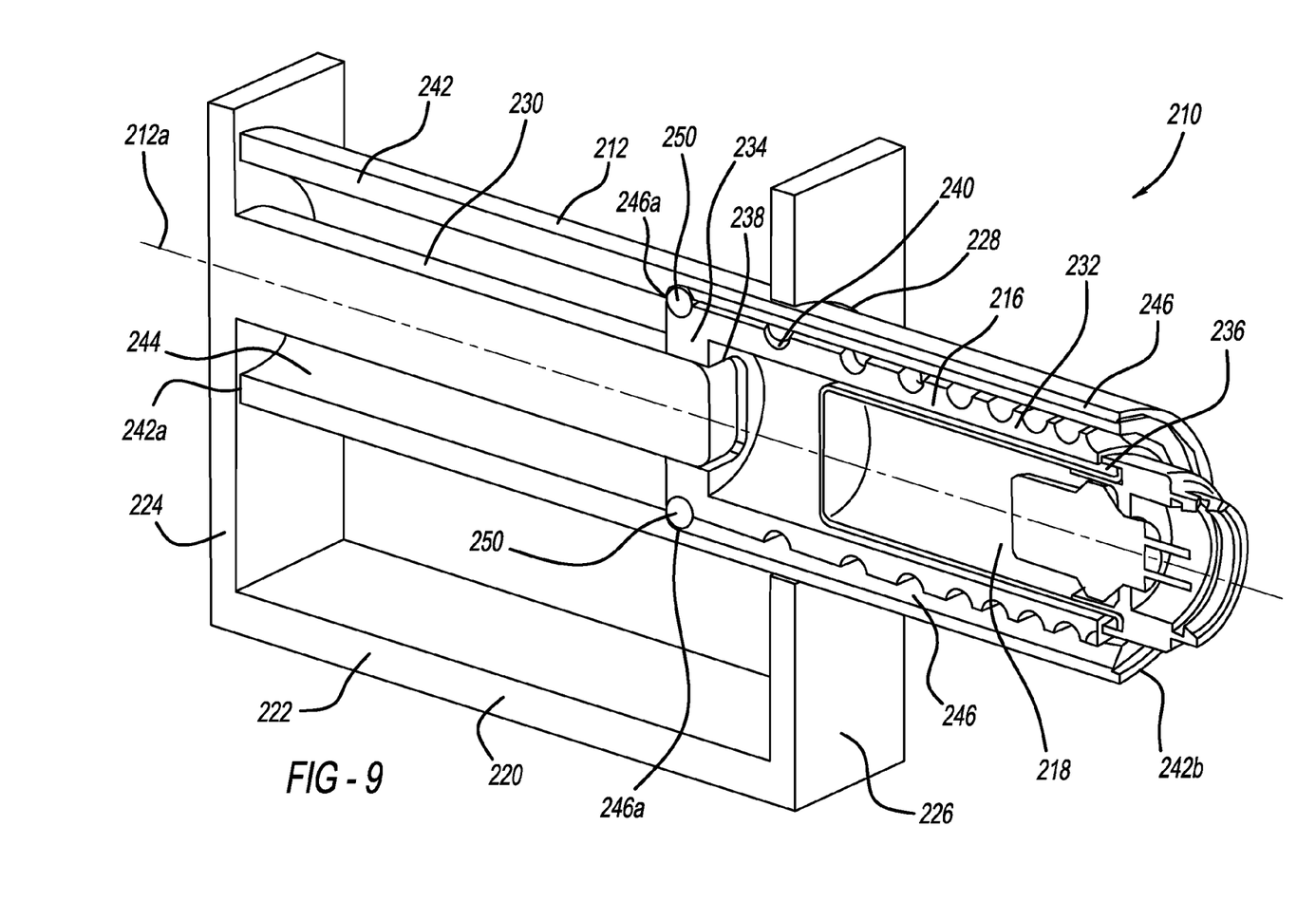
FIG. 9 is an isometric cross-sectional view of a third embodiment of a seatbelt pretensioner shown in a first non-deployed condition.
Figure 10:
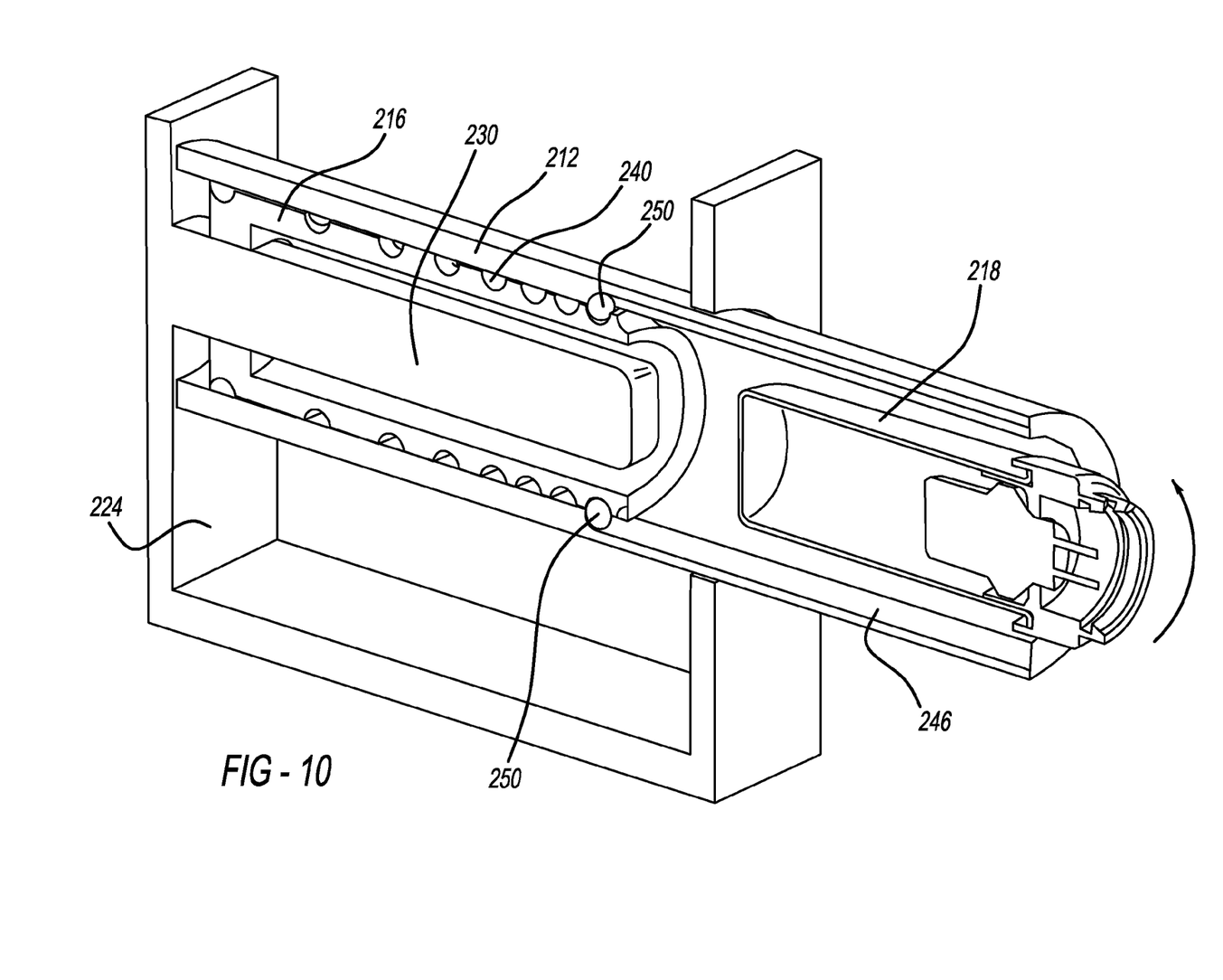
FIG. 10 is an isometric cross-section view of the third embodiment of the seatbelt pretensioner shown in a second deployed condition.
Figure 11:
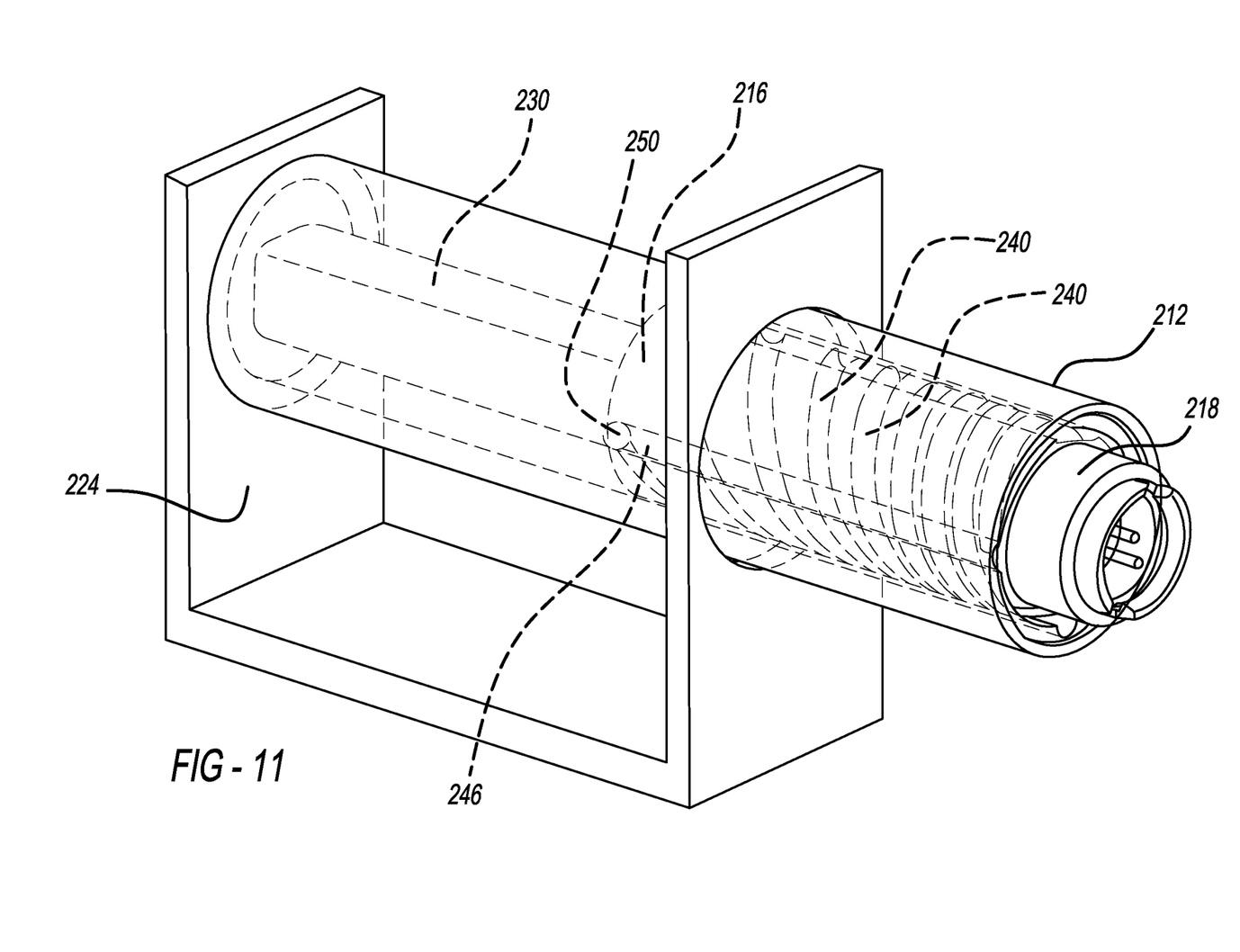
FIG. 11 is an isometric view of the third embodiment of the seatbelt pretensioner shown in the first non-deployed condition.

With reference to FIGS. 9-11, an alternative embodiment of a seatbelt retraction device 210 is provided. The device 210 includes a spindle 212 adapted to wind a seatbelt (not shown) therearound in response to rotation of the spindle 212. The spindle 212 defines a longitudinal axis 212a that extends through the center of the spindle 212. The seatbelt can be mounted to the spindle 212 in a manner known in the art. The spindle 212 is rotated in response to translation of a helical driver 216. The helical driver 216 is mounted within the spindle 212 and translates longitudinally relative to the spindle 212. The linear translation of the helical driver 216 is converted into rotational movement of the spindle 212, as further described below. A gas generator 218 is mounted within the helical driver 216 to force the helical driver 216 to move longitudinally away from the gas generator 218 in response to the gas generator 218 being fired.

The spindle 212 is mounted for rotation to a frame 220. The frame 220 includes a base 222, a first endwall 224, and a second endwall 226. The second endwall 226 includes a generally circular opening 228. The spindle 212 extends through the opening 228 and bears against the opening 228 as it rotates, such that the opening operates as a plain bearing. However, other bearing types between the spindle 212 and the opening 228 could also be used.

A fixed rod 230 extends longitudinally along the axis 212a from the first endwall 224 and into the spindle 212. The rod 230 can have a generally square cross-section, but could also include another cross-sectional shape, such as a spline, an oval, a rectangular, or other non-circular shape. The helical driver 216 is configured to translate along the rod 230, so the cross-section of the rod 230 will limit the helical driver 216 from rotating as the helical driver 216 translates therealong.

Turning now to the helical driver 216, the helical driver 216 has a generally tubular body 232 having a generally circular cross-section. The driver 216 includes an endwall portion 234 at one end and an opening 236 at the other end. The endwall portion 234 includes a hole 238 therethrough that corresponds to the size and shape of the fixed rod 230. The fixed rod 230 extends through the hole 238, and the non-circular shape of the rod 230 and hole 238 limits the helical driver 216 from rotating as it translates.

The helical driver 216 includes a spiraling slot 240 on the outer surface of the body 232. The slot 240 spirals around the body 232 of the helical driver 216 at a varying lead as the slot 240 spirals from one end to the other, such that longitudinally adjacent portions of the slot 240 become closer together as the slot 240 spirals from the end nearest the endwall portion 234 toward the end nearest the opening 236. The decreasing lead of the spiraling slot 240 will result in the spindle 212 increasing its rotational rate assuming the helical driver 216 translates at a constant rate. The helical driver could include a pair of spiraling slots 240 (as shown) that spiral at approximately the same rate. The pair of slots 240 can be on diametrically opposite sides of the helical driver 216. It will be appreciated, however, that the slots 240 could be circumferentially closer, if desired, or a greater number of slot could be used.

The gas generator 218 is mounted at the opening 236 of the helical driver 216. The gas generator 218 has a generally tubular shape that corresponds to the inner diameter of the helical driver 216. Thus, the helical driver 216 will translate along the gas generator 218 as well as along the rod 230 as it translates.

The spindle 212 surrounds the helical driver 216, and can have a length such that the helical driver 216 is substantially within with the spindle 212 prior to the gas generator 218 being fired, with the free end of the rod 230 generally aligned with the endwall 234 of the driver 216. The spindle 212 has a generally tubular body 242 that defines a cavity 244 therein in which the helical driver 216 and rod 230 are disposed. The tubular body 242 can include a first open end 242a and second open end 242b. The inner diameter of the body 242 of the spindle 212 generally corresponds to the outer diameter of the helical driver 216. The spindle 212 further includes a pair of longitudinal slots 246 in the case where there are two spiraling slots 240 in the helical driver. The number of longitudinal slots 246 preferably corresponds to the number of spiraling slots 240. The longitudinal slots extend from the second open end 242b and toward the middle of the spindle 212 and define an inner end 246a of the slot.

The device 210 also includes a pair of ball bearings 250, or the like, disposed between the spiraling slot 240 and the longitudinal slot 246. In the case of a pair of slots 240 and a pair of slots 246, then a pair of bearings 250 will be used. The bearings 250 are held within the slots 240 and 246, and act on the spindle 212 to rotate the spindle 212 when the helical driver 216 is translated. The bearings 250 are disposed at the inner end 246a of the longitudinal slot 246. In another form, the spindle 212 can include a pair of posts or other protrusion (not shown) that extends into the spiraling slot 240 at a location similar to the end of the longitudinal slot 246. In this case, the spindle 212 can be without longitudinal slots 246. In another form, the spindle 212 can include an indentation or depression (not shown), that holds the bearing 250 in place at approximately the same location as the inner end 246a of the longitudinal slot 246, such that the bearing 250 is received in the slot 240.

The device 210 has a first, non-fired state, as described above and shown in FIGS. 9 and 11. In this state, the helical driver 216 is disposed at one end of the spindle 212, with the rod 230 extending between the first endwall 234 of the driver 226 and the first endwall 224 of the frame 220. The bearings 250 are disposed at the inner end 246a of the longitudinal slot 246 and also within the spiraling slot 240 at the end of the helical driver 216 nearest the first endwall 234 of the driver 216.

In the event of a crash or other vehicle event where pretensioning is desired, the device 210 will be caused to activate in a manner known in the art. The gas generator 218 will fire, causing an increase in pressure within the helical driver 216. The increase in pressure 216 will force the helical driver 216 longitudinally away from the gas generator 218 and toward the first endwall 224 of the frame 220. The helical driver 216 will translate longitudinally and be limited from rotating due the interaction between the rod 230 and the opening 238 in the endwall 234 of the driver 216.

As the driver 216 moves longitudinally without rotating, the spiraling slot 240 will act against the bearings 250. The spiraling slot 240 will attempt to force the bearings 250 in the same direction as the driver 216 is moving. The bearings 250 will act on the inner end 246a of the slot 246, and attempt to force the spindle 212 in the same direction as the helical driver 216. The spindle 212 will bear against the endwall 224 of the frame 220, limiting its longitudinal movement. In response, because the bearings 250 cannot move in the same direction as the driver 216, they will track along the spiraling slots 240. As the bearings 250 track along the slots 240, they will act against the longitudinal slots 246 in the spindle 212, causing the spindle 212 to rotate. The rotation of the spindle 212 will cause the seatbelt to be wound therearound, thereby pretensioning the seatbelt.

The varying lead of the spiraling slot 240 on the helical driver 216, as shown in FIG. 11, can assist the spindle 212 in being rotated. As the driver 216 is initially translated, the inertia in the device 210 will require a greater amount of force to be transferred to rotate the spindle 212. The larger lead of the spiraling slot 240 that acts against the bearings 250 as the driver 216 initially translates can ease the spindle 212 into rotating relative a spiraling slot with a smaller lead. Once the spindle 212 starts rotating, less force is required to rotate the spindle 212, and the smaller lead of the spiraling slot 240 will cause the spindle 212 to increase its rotation for a given length of translation of the driver 216.

Figure 12:
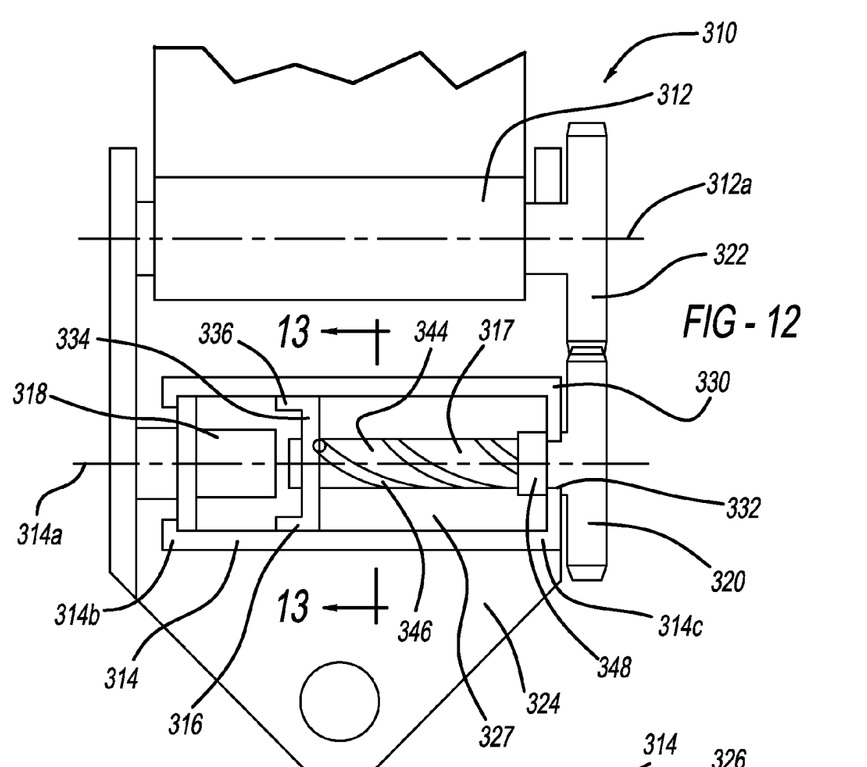
FIG. 12 is a plan view of a fourth embodiment of a seatbelt pretensioner shown in a first non-deployed condition.
Figure 13:
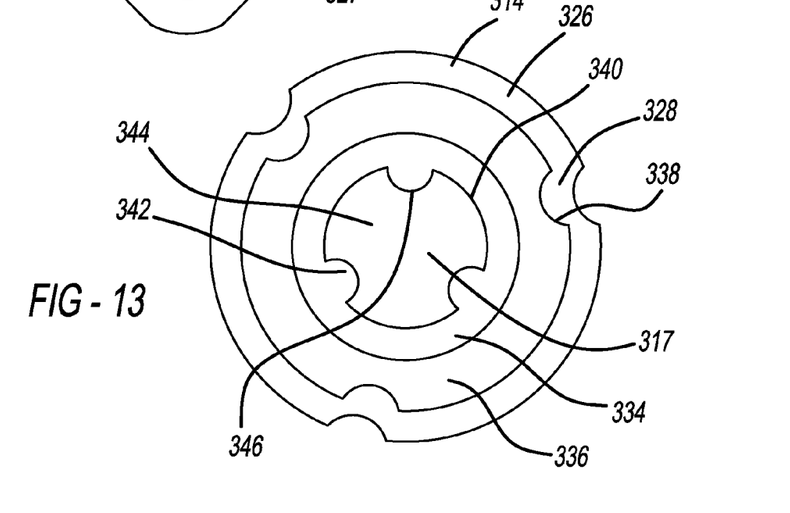
FIG. 13 is a cross-sectional view taken along the line 13-13 in FIG. 12.
Figure 14:
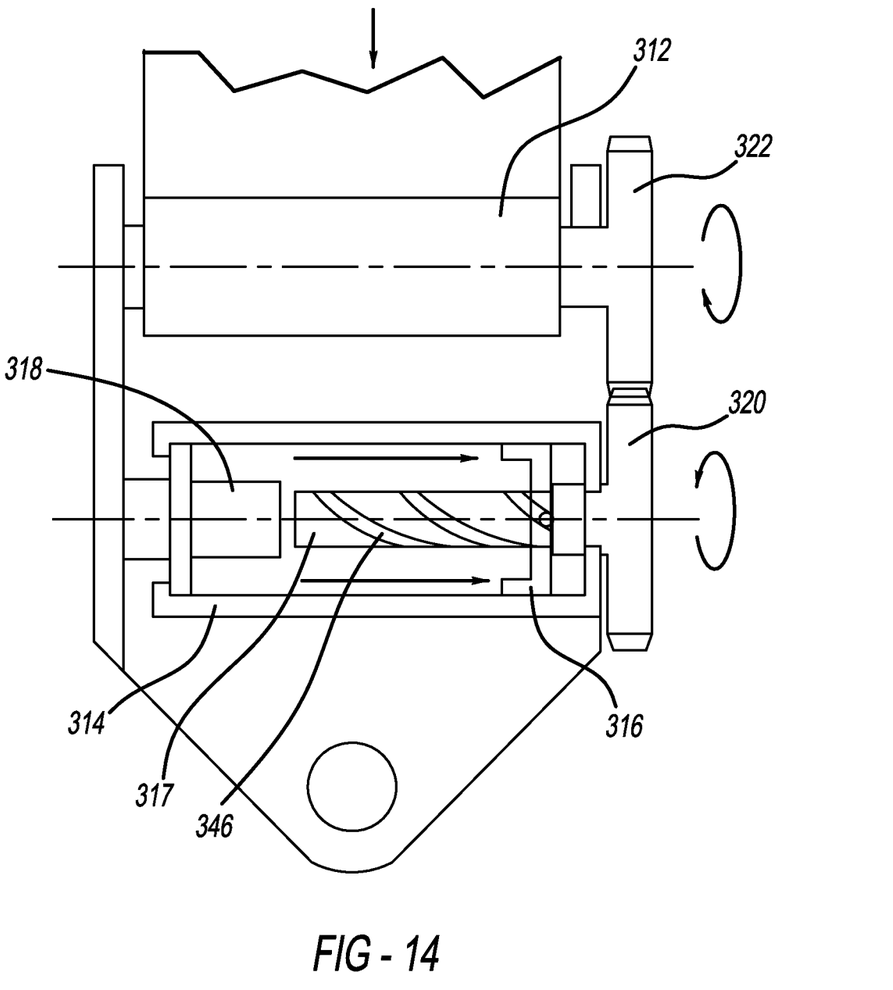
FIG. 14 is a pan view of the fourth embodiment of the seatbelt pretensioner shown in a second deployed condition.

With reference to FIGS. 12-14, another embodiment of a seatbelt pretensioning device 310 is provided. The device 310 includes a spindle 312 for pretensioning a seatbelt 314 in response to rotation of the spindle 312. The spindle 312 has a generally cylindrical or tubular shape and defines a longitudinal axis 312a. The device 310 further includes a tubular housing 314 that defines a longitudinal axis 314a that is offset from the axis 312a and preferably parallel to the axis 312a. The device further includes a piston 316 mounted within the housing 314 for translation along the axis 314a while being limited from rotating within the housing 314. A drive member 317 is mounted to the piston 316 within the housing and configured to rotate relative to the housing 314 and the piston 316 in response to longitudinal translation of the piston 316. The device further include a gas generator 318 mounted within the housing 314 for forcing the piston 316 to translate longitudinally away from the gas generator 318. The drive member 317 is mounted to a first gear 320 outside of the housing, and the spindle 312 is mounted to a second gear 322 that is coupled to the first gear 320. Thus, linear translation of the piston 316 will be converted into rotational movement of the drive member 317, which will thereby rotate the spindle 312 via the connection between the gears 320 and 322. The housing 314 is fixedly mounted to a frame 324, with the spindle 312 rotationally mounted to the frame 324 or another component that is fixed relative to the housing 314.

Turning now to the housing 314, the housing 314 has a generally tubular shape and includes a sidewall 326 that defines a cavity 327 therein. The sidewall 326 includes at least one and preferably three longitudinal tracks 328 (FIG. 13) extending along the inner surface of the sidewall 326 and along the length of the housing 314, at least along the portion of the housing 314 that the piston 316 will travel. The housing 314 includes a first end 314b where the gas generator 318 is mounted, and a second end 314c. The second end 314c can be in the form of a plate 330 having a circular hole 332 therethrough. The hole 332 supports and holds the drive member 317, while acting as a bearing surface to allow the drive member 317 to rotate. The first end 314b can be crimped to hold the gas generator 318, or the gas generator 318 can be otherwise mounted to the first end 314b in a manner known in the art.

The piston 316 has a generally circular profile with a main body portion 334 that extends across the cavity 327 of the housing 314. The piston 316 can further include a flange portion 336 that extends generally perpendicularly from the outer edge of the main body portion 324 generally along the sidewall 326 of the housing 324. The piston 316 can further include at least one and preferably three grooves 338 that correspond to the tracks 328 of the housing 314. The interaction between the tracks 328 and the grooves 338 limits the piston 316 from rotating while allowing it to translate longitudinally within the housing 314. The piston 316 further includes a circular hole 340 that extends through the center of the body portion 334. At least one and preferably three tabs 342 extend radially inward from the edge of the hole 340. These tabs 342 are used to force the drive member 317 to rotate in response to translation of the piston 316.

The drive member 317 has a generally circular profile and a generally cylindrical or tubular main body portion 344. The drive member 317 further includes at least one and preferably three spiraling slots or flutes 346 that correspond to the tabs 342 of the piston 316. The tabs 342 extend into the flutes 346. The drive member 317 further includes a flange member 348 disposed at the end of the drive member 317 adjacent the plate 330. The flange member 348 will limit the drive member 317 from being translated longitudinally away from the gas generator 318. The piston 316 is configured to translate longitudinally along the drive member 317, and the longitudinal translation will be converted into rotation of the drive member 317 by the interaction between the tabs 342 and the spiraling flutes 346.

The first gear 320 is fixedly mounted to the end of the drive member 317 outside of the housing 314 so that rotation of the drive member 317 will cause the first gear 320 to rotate. The second gear 322 is fixedly mounted to the spindle 312 so that rotation of the second gear 322 will cause the spindle 312 to rotate. The first gear 320 and second gear 322 are coupled so that rotation of the drive member 317 will cause the first gear 320 to rotate in a first direction, the second gear 322 will rotate in the opposite direction, and the spindle 312 will rotate along with the second gear 322.

The device 310 has a first, non-fired state where the piston 316 is disposed at the end of the drive member 317 that is not coupled to the first gear 320. In the event of a collision or other vehicle event causing the device 310 to be activated, the gas generator 318 will fire, causing an increase in pressure within the housing 314. The increased pressure will act on the piston 316, forcing it away from the gas generator 318 and along the housing 314 and drive member 317. The piston 316 will be limited from rotating due to the tracks 328 and grooves 338. As the piston 316 translates, the tabs 342 will act on the flutes 346 of the drive member 317. The drive member 317 will thereby be caused to rotate as the tabs 342 track along the flutes 346. The drive member 317 will be forced against the plate 330, but limited from translating due to the flange 348. The drive member 317 will thereby rotate within the hole 332 of the plate 330, causing the gears 320 and 322 to rotate, as described above, and the spindle 312 to rotate and pretension the seatbelt.

While the above description constitutes the preferred embodiment of the present invention, it will be appreciated that the invention is susceptible to modification, variation and change without departing from the proper scope and fair meaning of the accompanying claims.

What is claimed is:

1. A seatbelt pretensioning system for acting on a seatbelt of an occupant restraint system of a motor vehicle, the system comprising:
    a rotatable spool having a generally cylindrical sidewall defining a central longitudinal axis and a cavity centered on the longitudinal axis;
    a longitudinally translatable sleeve having a generally cylindrical sidewall that is coaxially aligned with the longitudinal axis and defining a cavity therein, the sleeve being mounted within the cavity of the spool for longitudinal translation therein;
    a spiraling flute formed by either the spool sidewall within the cavity or the translatable sleeve, and a follower member formed by the other of the spool sidewall or translatable sleeve, wherein the follower member is coupled to the spiraling flute;
    a tube member having a generally cylindrical sidewall and defining a cavity therein, the tube being mounted within the sleeve sidewall, wherein the sleeve is translatable along the tube, wherein the cavity of the tube extends from a first end of the generally cylindrical sidewall of the tube member to a second end of the generally cylindrical sidewall of the tube member;
    a gas generator fluidly coupled to the tube cavity and being configured to produce an increase in pressure within the tube cavity, wherein the sleeve translates longitudinally away from the gas generator and along the tube in response to the increase in pressure caused by the gas generator, wherein the gas generator is in fluid communication with the cavity of the tube member from the first end to the second end thereof such that gas generated by the gas generator will fill the cavity of the tube member; and
    wherein the longitudinal translation of the sleeve causes the spool to rotate in response in accordance with the shape of the spiraling flute and its coupling to the follower member to cause the seatbelt to be pretensioned.

2. The system of claim 1, wherein the spiraling flute is formed by the spool and the follower member is formed on the sleeve, and the follower member extends into the spiraling flute.

3. The system of claim 2, wherein the follower member comprises a second spiraling flute.

4. The system of claim 2, wherein the protrusion comprises a round peg.

5. The system of claim 1, wherein the tube includes a protrusion extending therefrom, the sleeve includes a slot that receives the protrusion, and the sleeve is rotationally controlled by the protrusion and the slot.

6. The system of claim 5, wherein the slot spirals about the sleeve and the sleeve rotates in response to longitudinal translation thereof.

7. The system of claim 5, wherein the slot extends longitudinally along the sleeve and the sleeve is generally limiting from rotation in response to longitudinal translation thereof.

8. The system of claim 1, wherein the spool includes an opening at one end and the sleeve partially extends out of the opening when the sleeve has translated longitudinally.

9. The system of claim 1, wherein the spool rotates relative to the tube via a bearing connection therebetween.

10. The system of claim 9, wherein the bearing connection comprises a plain bearing.

11. The system of claim 9, wherein the spool is disposed within a head portion of the tube and the spool bears against an inner surface of the head portion.

12. The system of claim 9, wherein the spool includes a cylindrical recess, and a head portion of the tube is disposed within the recess and bears against an inner surface of the recess.

13. A seatbelt pretensioning system for acting on a seatbelt of an occupant restraint system of a motor vehicle, the system comprising:
    a rotatable spool having a generally cylindrical sidewall defining a central longitudinal axis and a cavity centered on the longitudinal axis;
    a longitudinally translatable sleeve having a generally cylindrical sidewall that is coaxially aligned with the longitudinal axis and defining a cavity therein, the sleeve being mounted within the cavity of the spool for longitudinal translation therein;
    a spiraling flute formed by either the spool sidewall within the cavity or the translatable sleeve, and a follower member formed by the other of the spool sidewall or translatable sleeve, wherein the follower member is coupled to the spiraling flute;
    a tube member having a generally cylindrical sidewall and defining a cavity therein, the tube being mounted within the sleeve sidewall, wherein the sleeve is translatable along the tube;
    a gas generator fluidly coupled to the tube cavity and being configured to produce an increase in pressure within the tube cavity, wherein the sleeve translates longitudinally away from the gas generator and along the tube in response to the increase in pressure caused by the gas generator; and
  wherein the longitudinal translation of the sleeve causes the spool to rotate in response in accordance with the shape of the spiraling flute and its coupling to the follower member to cause the seatbelt to be pretensioned;
    wherein the sleeve includes a first end and a second end of the sidewall of the sleeve, the first end being open and the second end being closed by an endwall, wherein the second end of the sleeve is disposed longitudinally further from the gas generator than the first end.

14. A seatbelt pretensioning device comprising:
    a rotatable spool member having a generally cylindrical sidewall defining a central longitudinal axis and a spool cavity;
    a spiraling flute spiraling in a first direction formed in the spool sidewall within the cavity;
    a longitudinally translatable intermediate sleeve having a generally cylindrical sidewall and defining a drive member cavity therein, the intermediate sleeve being mounted within the spool cavity and coupled to the spiraling flute;

a spiraling slot having a helical shape and extending through the sidewall of the intermediate sleeve that spirals in a second direction that is generally opposite the direction of the spiraling flute;

a peg extending radially outward from the sidewall of the intermediate sleeve and extending into the spiraling flute of the spool;

a tube having a generally cylindrical sidewall and defining a tube cavity therein, the tube being disposed at least partially within the drive member cavity, wherein the intermediate sleeve is translatable and rotatable relative to the tube;

a second peg extending radially outward from the sidewall of the tube and extending into the spiraling slot of the intermediate sleeve;

a gas generator fluidly coupled to the tube cavity and being configured to produce an increase in pressure within the tube cavity to force the intermediate sleeve away from the gas generator; and wherein the intermediate sleeve, in response to the increase in pressure within the tube cavity, translates away from the gas generator and rotates in a first direction due to the interaction between the second peg and the spiraling slot of the intermediate sleeve, and the first peg of the intermediate sleeve acts on the spiraling flute of the spool thereby rotating the spool to pretension the seatbelt.

15. The device of claim 14, wherein the intermediate sleeve is limited from translating and rotating when the second peg of the inner tube contacts an end of the spiraling slot of the intermediate sleeve.

16. The device of claim 14, wherein the spool portion includes an open end and the intermediate sleeve extends at least partially out of the open end when then sleeve has stopped rotating and translating.

17. The device of claim 14, wherein the intermediate sleeve has a first non-deployed condition with the first peg disposed a first longitudinal distance from the second peg and a second deployed condition with the first peg disposed a second longitudinal distance from the second peg that is smaller than the first longitudinal distance, wherein the device transitions from the first non-deployed condition to the second deployed condition when the gas generator is activated to translate the intermediate sleeve.

18. The system of claim 14, wherein the intermediate sleeve includes a first end and a second end of the sidewall of the sleeve, wherein the first end is open and the second end is closed by an endwall disposed at the second end of the of the sidewall, the endwall being further from the gas generator than the first end.

* * * * *